US006400425B1

(12) United States Patent
Kim et al.

(10) Patent No.: US 6,400,425 B1
(45) Date of Patent: Jun. 4, 2002

(54) TFT-LCD ARRAY SUBSTRATE FOR TESTING THE SHORT/OPEN-CIRCUIT OF ELECTRIC LINE AND A METHOD FOR FABRICATING THE SAME

(75) Inventors: Ki-Tae Kim; Seong-Su Lee, both of Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 21 days.

(21) Appl. No.: 09/750,250

(22) Filed: Dec. 29, 2000

(51) Int. Cl.[7] ................ G02F 1/1333; G02F 1/136; G02F 1/13; H01L 23/58; G09G 3/36
(52) U.S. Cl. ................ 349/40; 349/42; 349/138; 349/187; 349/192; 349/54; 257/48; 345/92
(58) Field of Search ................ 349/40, 42, 46, 349/138, 139, 187, 192, 54; 257/59, 72, 48; 345/92

(56) References Cited

U.S. PATENT DOCUMENTS

| 5,883,682 A | * | 3/1999 | Kim et al. ............. 257/59 |
| 6,005,647 A | * | 12/1999 | Lim ..................... 349/139 |
| 6,038,003 A | * | 3/2000 | Kim ..................... 349/43 |
| 6,081,308 A | * | 6/2000 | Jeong et al. ........... 257/59 |
| 6,184,948 B1 | * | 2/2001 | Lee ..................... 257/443 |
| 6,335,276 B1 | * | 1/2002 | Park et al. ............ 438/648 |

FOREIGN PATENT DOCUMENTS

| JP | 05-203988 | 8/1993 |
| KR | 1995-23283 | 7/1995 |

* cited by examiner

Primary Examiner—William L. Sikes
Assistant Examiner—Tarifur R. Chowdhury
(74) Attorney, Agent, or Firm—Long Aldridge & Norman LLP (57) ABSTRACT

The present invention discloses an array substrate of an active-matrix LCD device for testing the short and the open and a method of fabricating the same. For the purpose of the test, the array substrate of a liquid crystal display (LCD) device beneficially includes the first insulation layer and the second insulation layer having gate cutting holes penetrating the first and second insulation layers and the gate shorting bar connectors. The gate cutting holes are formed between the first gate shorting bar and the second gate pads and between the second gate shorting bar and the first gate pads. And the second insulation layer has source cutting holes penetrating the first and second insulation layers and the source shorting bar connector. The source cutting holes is formed between the first source shorting bar and the second source pads and between the second source shorting bar and the first source pads. And more particularly, at least one of the gate and source cutting holes has an uneven side portion in order to cut the shorting bar connectors easily, and the gate and source shorting bar connectors are thinner than the gate and source lines.

11 Claims, 9 Drawing Sheets

TFT-LCD ARRAY SUBSTRATE FOR TESTING THE SHORT/OPEN-CIRCUIT OF ELECTRIC LINE AND A METHOD FOR FABRICATING THE SAME

The present application is based on Korean Patent Application No. 1999-26940, filed Jul. 5, 1999, the entirety of which is incorporated by reference in this application.

BACKGROUND OF THE INVENTION

1. Field of the Invention

The present invention relates to a liquid crystal display (LCD) device and more, particularly, to an array substrate of an LCD device for testing the bus lines and a method of fabricating the same.

2. Discussion of the Related Art

In general, an LCD module has a display part and a non-display part or a pad part.

The display part of an LCD module usually has thin film transistors (TFTs) as switching devices. The display part of an LCD module is typically made up of two substrates having an interposed liquid crystal material. One substrate, referred to as the array substrate, includes a matrix array of TFTs and pixel electrodes. The array substrate also includes gate lines and source lines having gate electrodes and source electrodes, respectively. The opposing substrate, referred to as the color filter substrate, includes a light-shielding film (also known as a black matrix), a color filter, and a common electrode.

The pad part of an LCD module includes gate pads and source pads applying signal voltages and data voltages to the gate lines and the source lines, respectively. The gate pads are arranged on one side of the array substrate and the source pads are arranged on an adjacent side to the side having the gate pads.

Since the structure of the array substrate is complex, short/open-circuits can occur between the elements of the array substrate due to static electricity during a manufacturing process. In order to have the plural lines or elements of the array substrate in equipotential, shorting bars which are connected to every line formed. The shorting bars are removed in a cutting process after the array substrate is completed.

Referring to the attached drawings, an array substrate of an LCD device that is used for testing the short/open-circuit of the gate and source lines and that is manufactured by a conventional method will now be explained.

Figure 1:
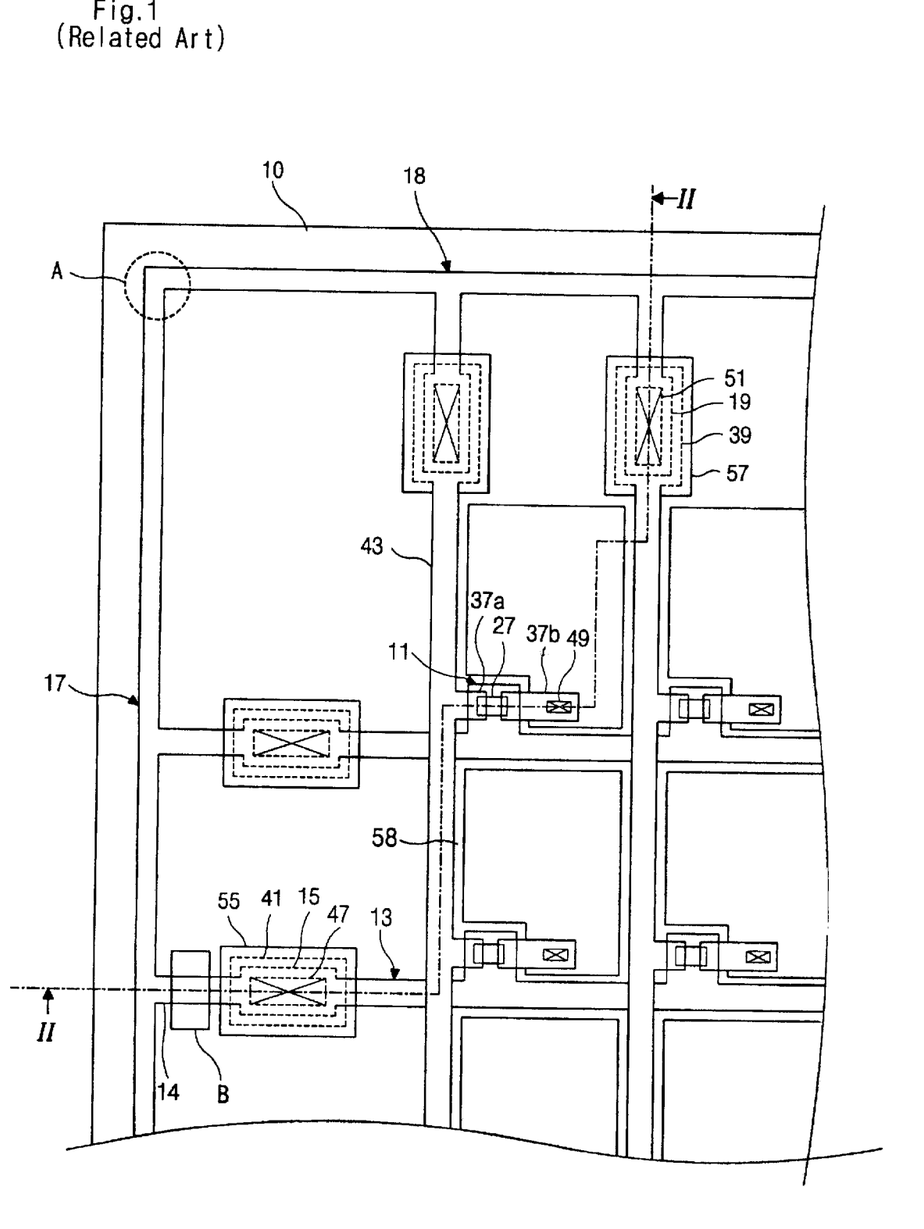
FIG. 1 is a partial plan view illustrating the pad part and the inverted staggered type thin film transistors (TFTs) according a conventional TFT array substrate.

FIG. 1 is a partial plan view illustrating a pad part and inverse staggered type thin film transistors (TFTs) according to the conventional TFT array substrate. As shown in FIG. 1, the gate pad 15 is positioned on the left side of the substrate 10 and the source pad 39 is positioned on the upper side of the substrate 10. A gate shorting bar 17 is arranged in a longitudinal direction at the left peripheral portion of the substrate 10 and a source shorting bar 18 is arranged in a transverse direction at the upper peripheral portion of the substrate 10. A gate line 13 is arranged in a transverse direction on the substrate 10 and a source line 43 is arranged in a longitudinal direction on the substrate 10. The gate and source lines 13 and 43 define the pixel region 58. A TFT including a gate electrode 11, an active layer 27 and source and drain electrodes 37a and 37b is positioned at one corner of the pixel region 58 and near the crossing point of the gate and source lines 13 and 43. The other elements shown in FIG. 1 will be explained with reference to FIGS. 2A to 2F.

FIGS. 2A to 2F are cross-sectional views of line II—II of FIG. 1 and illustrate a manufacturing process of an array substrate according to the conventional art.

Figure 2A:
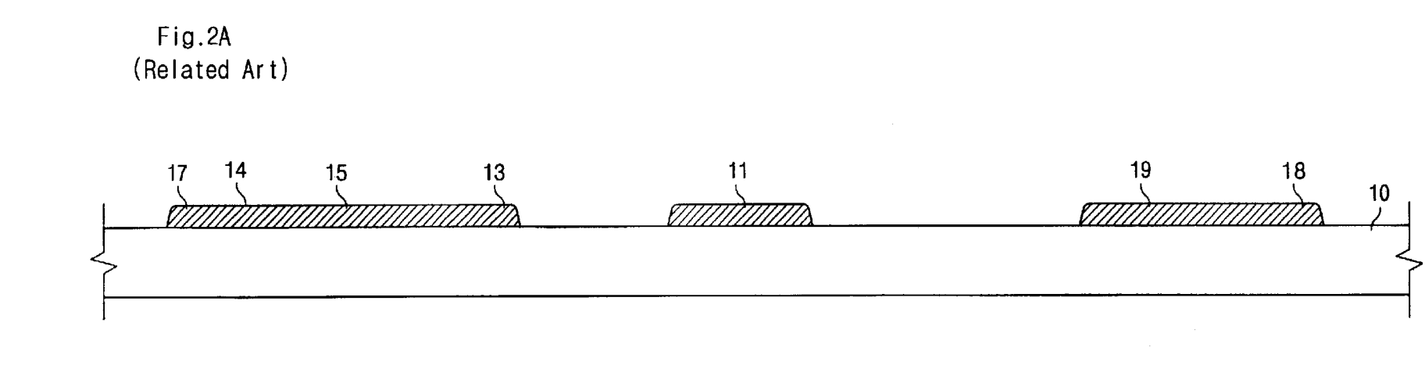
FIGS. 2A to 2F are cross-sectional views taken line II—II and illustrate a manufacturing process according to the conventional art.

As shown in FIG. 2A, a first metallic or conductive material such as aluminum (Al) and Al-alloy is deposited on the substrate 10. The material is patterned to form a gate line 13, a gate electrode II extended from the gate line 13, a gate pad 15, a gate shorting bar 17, a shorting bar connector 14 connecting the gate pad 15 with the gate shorting bar 17, and a source shorting bar 18 and a source shorting bar connector 19 connecting a source pad 39 with the source shorting bar 18. The source pad 39 is formed in a later step As a metal for the above-mentioned elements, aluminum is mainly used so as to reduce the RC delay from its low resistance. However, pure aluminum is weak in acidity and may result in line defects by a formation of a hillock during a high temperature process. Thus, an aluminum alloy may be used. In some cases, a double layered gate structure having another metal layer, such as chrome (Cr) or molybdenum (Mo) covering the aluminum or aluminum alloy layer, is used.

The gate shorting bar 17 is connected to the source shorting bar 18 so that the gate and source shorting bars 17 and 18 make a rectangular shape around the array substrate, i.e., they surround the pad part and the display part of the array substrate (see FIG. 1). The gate shorting bar 17 is connected to every gate pad, which is connected to the gate lines, in order to maintain an equipotential state for the plural gate lines. Therefore, since the gate pad 15 and the gate line 13 have an equipotential by the gate shorting bar 17, the open/short-circuit caused by static electricity during the manufacturing process is prevented.

Similar to the gate shorting bar connector 14, the source shorting bar connector 19 connects the source shorting bar 17 and the source pad 39 (see FIG. 1) formed in a later process step.

Figure 2B:
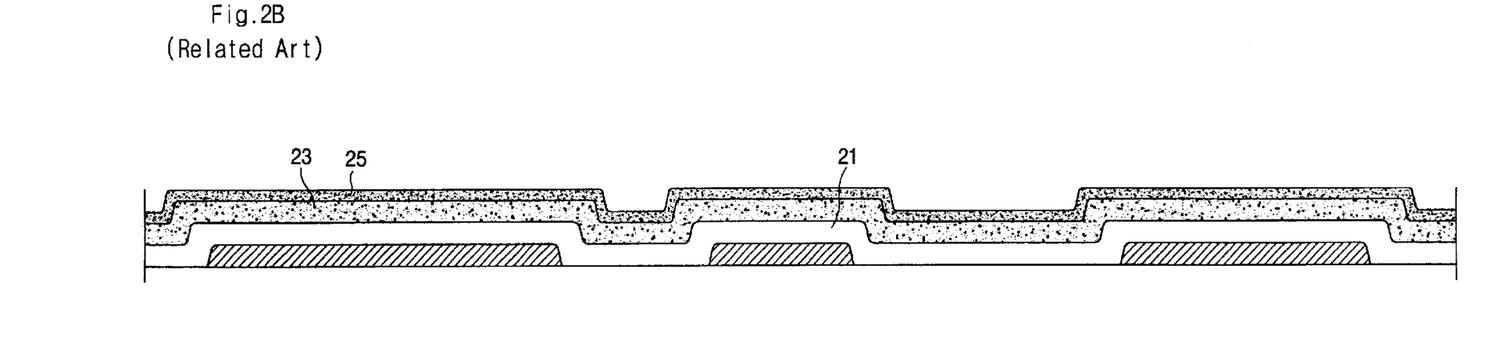

Referring to FIG. 2B, the first insulation layer 21 including silicon nitride ($SiN_x$) or silicon oxide ($SiO_x$) is formed over the substrate and over the first metallic layer. At this time, the gate electrode II can be oxidized to form an aluminum oxide ($Al_2O_3$) layer on its surface using a mask process before depositing the insulation material. After forming the first insulation layer 21, an intrinsic semiconductor layer 23 and a doped semiconductor layer 25 are sequentially formed on the first insulation layer 21.

Figure 2C:
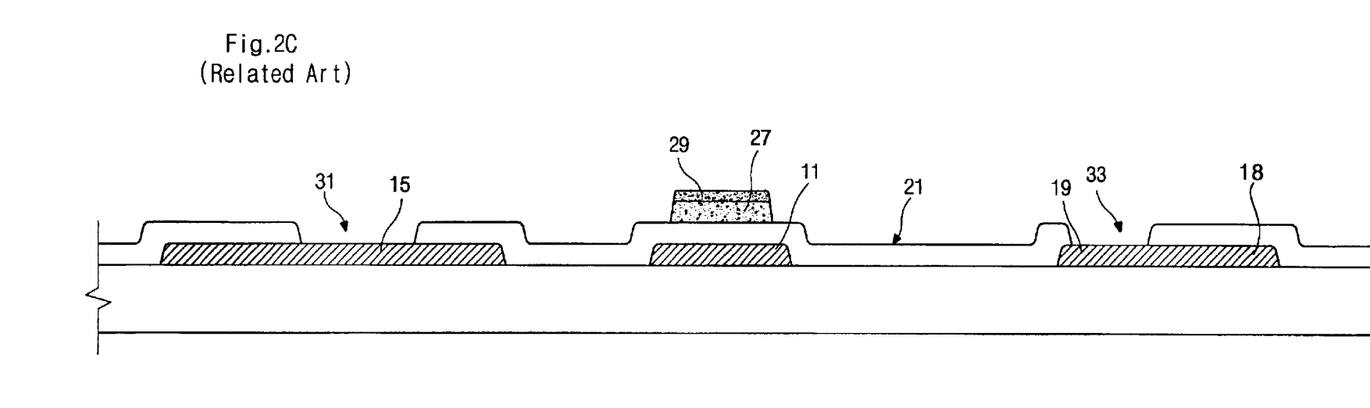

As shown in FIG. 2C, an active layer 27 and an ohmic contact layer 29 are formed in an island shape by patterning the intrinsic and doped semiconductor layers 23 and 25 at the same time. Then, a first gate pad contact hole 31 and a first source pad contact hole 33 are formed by patterning the first insulation layer 21.

Figure 2D:
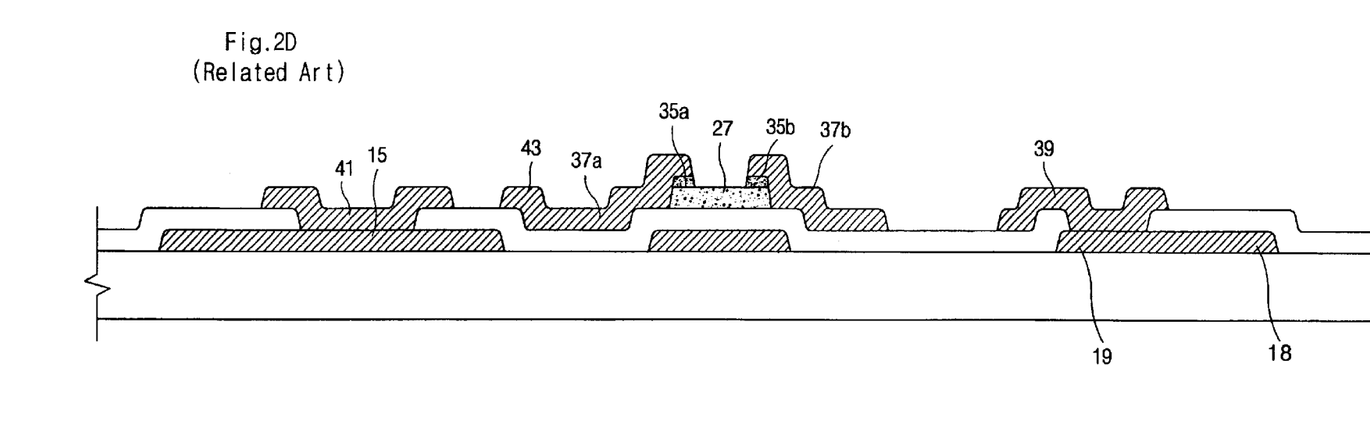

Referring to FIG. 2D, a second metallic or conductive material such as chrome or chrome alloy are deposited and patterned to form the source electrode 37a, the drain electrode 37b, the source line 43 connected to the source electrode 37a, a gate pad electrode 41 connected to the gate pad 15 via the first gate pad contact hole 31, and the source pad 39 connected to the source shorting bar connector 19 via the first source pad contact hole 33. Therefore, every source line is connected to the shorting bar 18 through the source shorting bar connector 19, i.e., the source lines have equipotential. The portion of the ohmic contact layer 27 between the source electrode 37a and the drain electrode 37b is patterned to form spaced apart ohmic contact layers 35a and 35b using the gate and source electrodes 37a and 37b as masks.

Figure 2E:
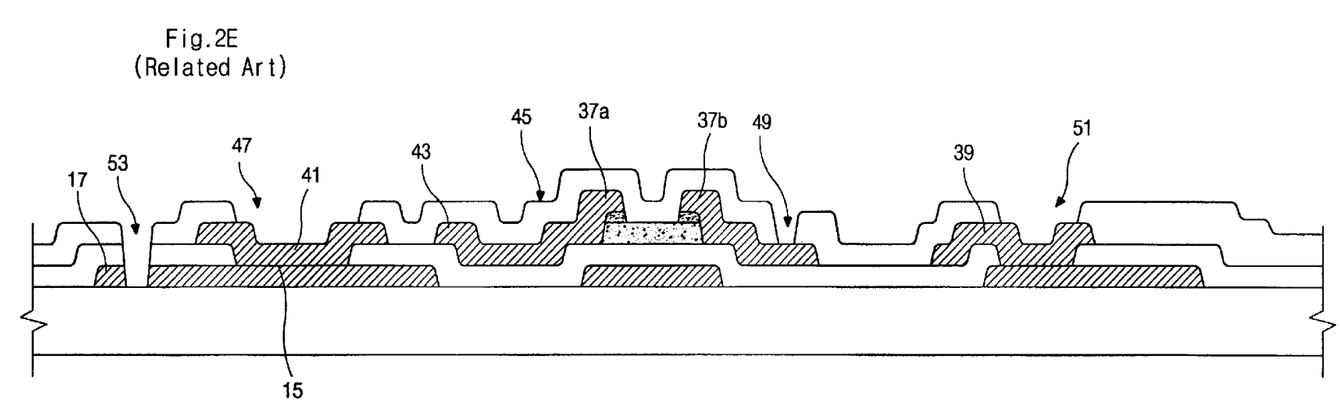

As shown in FIG. 2E, a second insulation layer 45 is formed on the entire resultant surface and patterned to form a second gate pad contact hole 47, a gate cutting hole 53 penetrating the first and second insulation layers 21 and 45. A second source pad contact hole 51 and a drain contact hole 49 are also formed in this patterning process. Then, the portion of the gate shorting bar connector 14, which is exposed by the gate cutting hole 53, is etched (see "B" of FIG. 1).

The reason for forming the gate cutting hole 53 is that the gate lines neighboring each other are examined for possible shorts or opens. For the purpose of these tests, the gate lines are generally classified into even-numbered and odd-numbered gate lines, and electric signals are applied. If the even-numbered gate pads connected to the even-numbered gate lines contact the right side shorting bar (not shown), the odd-numbered gate pads connected to the odd-numbered gate lines contact the left side shorting bar 17. If the electric signals are applied to the left-side shorting bar, a line test is done to determine which odd gate line is cut and/or shorted. Thus, the gate shorting bar connector 14 for the even-numbered gate lines in the left-sided portion should be cut by the gate cutting hole 53.

As mentioned above, the even-numbered gate pads and gate lines are tested by the above-mentioned process as well. A similar process is used to test the source pads and the source lines.

In the conventional array substrate, to perform the test, the source shorting bar 18 and the gate shorting bar 17 are separated by removing portion "A" (see FIG. 1).

Figure 2F:
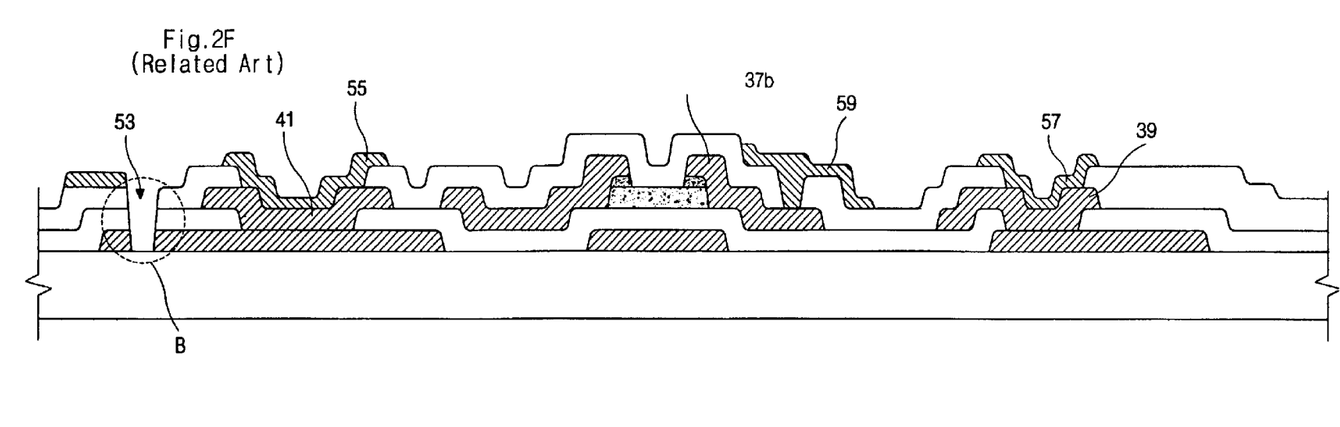

As shown in FIG. 2F, a transparent conductive material such as ITO (Indium-Tin-Oxide) is deposited on the entire surface. The transparent conductive material is patterned to form a gate pad terminal 55 contacting the gate pad electrode 41 via the second gate pad contact hole 47, a source pad terminal 57 contacting the source pad 39 via the second source pad contact hole 53 and a pixel electrode 59 contacting the drain electrode 37b via the drain contact hole 49. During this patterning process, the transparent conductive material deposited in the gate cutting hole 53 is removed as well.

Figure 3:
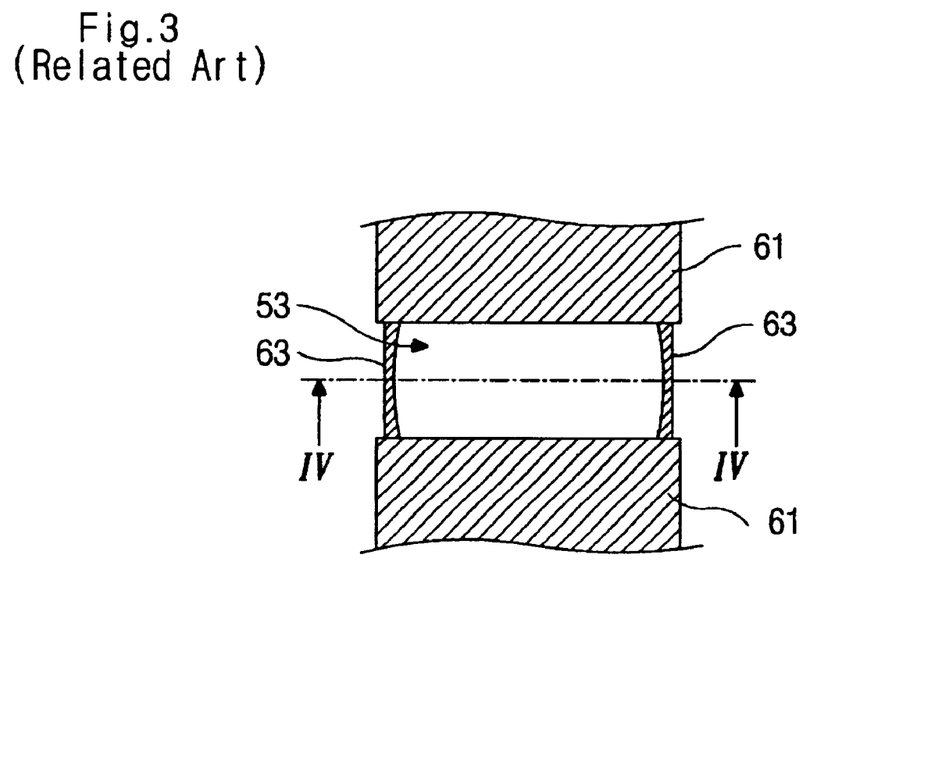
FIG. 3 is an enlarged plan view of the portion "B" of FIG. 2F and illustrates the gate cutting hole after patterning the transparent conductive material

FIG. 3 is an enlarged plan view of the portion "B" of FIG. 2F and illustrates the gate cutting hole after patterning the transparent conductive material. As shown in FIG. 3, a residue 63 of the transparent conductive material exists around the gate cutting hole 53 and is electrically connected to each of the cutting portion 61 of the shorting bar connector 14 (see FIGS. 1 and 2A).

Figure 4:
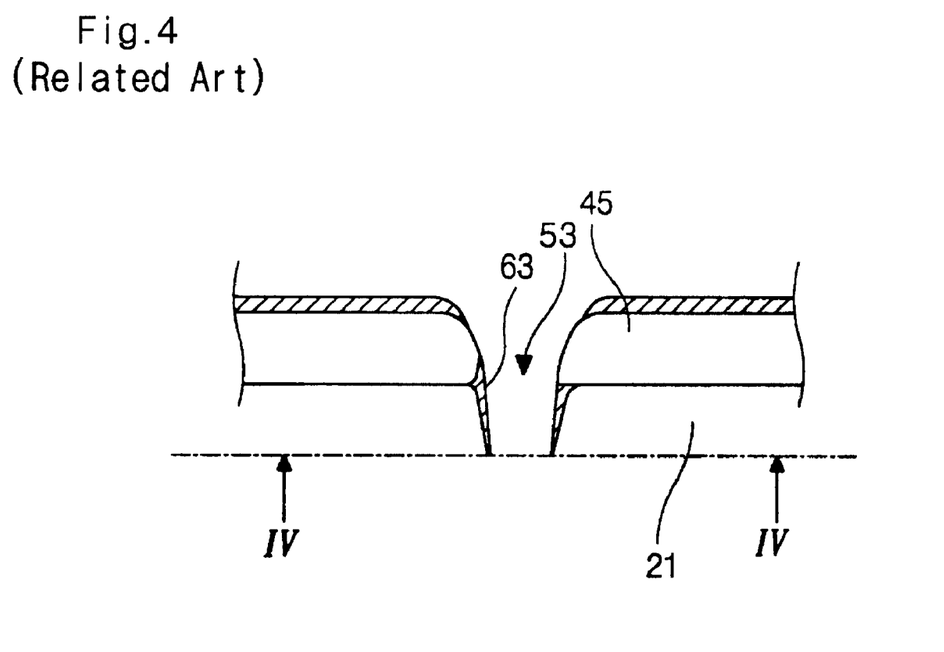
FIG. 4 is a cross-sectional view taken line IV—IV of FIG. 3.

FIG. 4 is a cross-sectional view of line IV—IV of FIG. 3. As shown in FIG. 4, the residue 63 of the transparent conductive material is caused by a step between the first insulation layer 21 and the second insulation layer 45. The residue 63 remains in the gate cutting hole 53.

When etching the first and second insulation layer 21 and 45, a dry etch technique is employed using a gas etchant such as $SF_6$. During the dry etch process, some of the gas etchant remains in the lower part of the gate cutting hole 53, and due to this residual gas etchant, the first insulation layer 21 is etched more than the second insulation layer 45. Thus, a step between the first insulation layer 21 and the second insulation layer 45 results from over-etching the first insulation layer 21.

Another reason causing the step between the first insulation layer 21 and the second insulation layer 45 is explained below. Although the same insulation material is used for the first and second insulation layers 21 and 45, the depositing condition (such as the depositing temperature) of the first insulation layer 21 is different from that of the second insulation layer 45 because the first insulation layer 21 covers an aluminum layer. As mentioned above, since aluminum is employed as the first metallic layer and is vulnerable to high temperature, aluminum can become easily open-circuited in high temperature. Thus, the depositing temperature of the first insulation layer 21 is made lower than that of the second insulation layer 45. Thus, the characteristics of the first and second insulation layers are different. This difference causes the different etch rate causing the step between the first insulation layer and the second insulation layer. Therefore, the residue 63 of the transparent conductive material, which is unetched, is electrically in contact with the lines causing a line short between the odd-numbered line and the even-numbered line.

SUMMARY OF THE INVENTION

Accordingly, the present invention is directed to an array substrate of a liquid crystal display device and method of fabricating the same that substantially obviates one or more of the problems due to limitations and disadvantages of the related art.

An advantage of the present invention is a method of fabricating the array substrate capable of testing a short/open-circuit of a gate/source line.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of manufacturing an array substrate of an LCD device, and an array substrate fabricated by the method. Such an array substrate for a liquid crystal display (LCD) device, beneficially including: a plurality of gate lines, a plurality of first and second gate pads at each end of the gate lines, first and second gate shorting bars, and a plurality of first and second gate shorting bar connectors connecting the first and second gate pads to the first and second gate shorting bars, respectively, on the substrate; a first insulation layer formed over the substrate while covering the gate lines, the gate pads, the gate shorting bar connectors and the gate shorting bars; a plurality of source lines, a plurality of first and second source pads at each end of the source lines, first and second source shorting bars, and a plurality of first and second source shorting bar connectors connecting the first and second source pads to the first and second source shorting bars, respectively, on the first insulating layer; a second insulation layer formed over the source lines, the source pads, the source shorting bar connectors and the source shorting bars; the first insulation layer and the second insulation layer having gate cutting holes penetrating the first and second insulation layers and the gate shorting bar connectors, the gate cutting holes formed between the first gate shorting bar and the second gate pads and between the second gate shorting bar and the first gate pads; the second insulation layer having source cutting holes penetrating the first and second insulation layers and the source shorting bar connector, the source cutting holes formed between the first source shorting bar and the second source pads and between the second source shorting bar and the first source pads; and wherein at least one of the gate and source cutting holes has a uneven side portion.

The side portion of one of the gate and source cutting holes has a plurality of concaves and convex in series. A thickness of the gate shorting bar connector is smaller than that of the gate line, and a thickness of the source shorting bar connector is smaller than that of the source line.

The principles of the present invention further provide a method of fabricating an array substrate for a liquid crystal display (LCD) device, beneficially including: forming a gate line having a gate electrode, a gate pad at an end of the gate line, a gate shorting bar and a gate shorting bar connector connecting the gate shorting bar and the gate pad on a substrate, thereby defining a first intermediate structure; forming a first insulation layer on the first intermediate structure; forming an active layer over the gate electrode on the first insulation layer, thereby defining a second intermediate structure; forming source and drain electrodes connected to the active layer, a source line having the source electrode, a source pad at an end of the source line, a source shorting bar and a source shorting bar connector connecting the source shorting bar and the source pad on the second intermediate structure, thereby defining a third intermediate structure; forming a second insulation layer on the third intermediate structure; forming a gate cutting hole by patterning the first and second insulation layers and the gate shorting bar connector; forming a source cutting hole by patterning the first and second insulation layers and the source shorting bar connector; and wherein at least one of the gate and source cutting holes has a uneven side portion.

The gate shorting bar connector is thinner than the gate line and the source shorting bar connector is thinner than the source line.

According to another method to solve the above problem, a method of fabricating an array substrate for a liquid crystal display (LCD) device, further including: forming a gate pad hole penetrating the first and second insulation layers to expose the gate pad; forming a source pad hole penetrating the second insulation layer to expose the source pad; and forming first and second lines connected to the gate pad and the source pad via the gate pad hole and source pad hole, respectively.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the principles of the present invention, examples of which are shown in the accompanying drawings.

Figure 5:
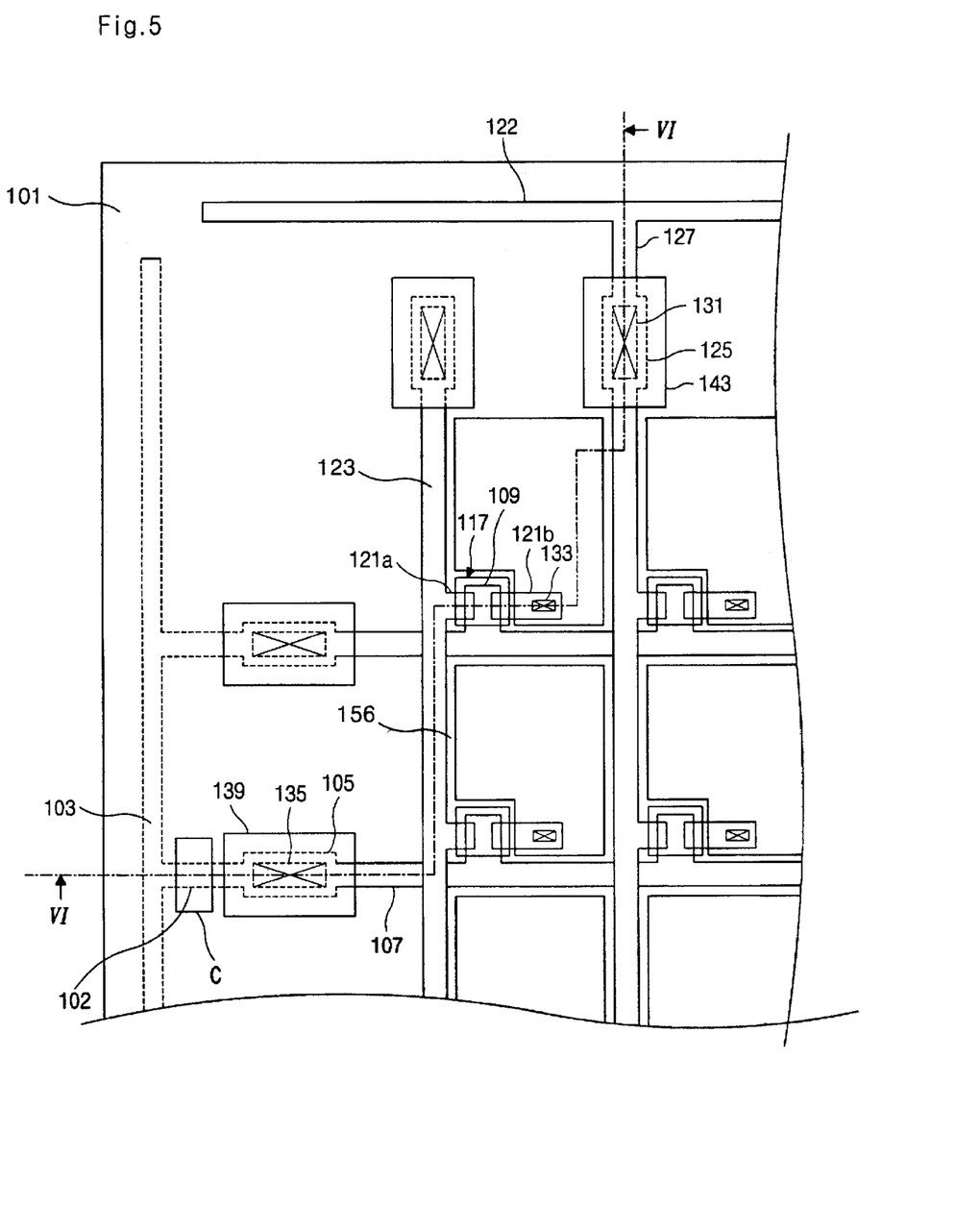
FIG. 5 is a partially schematic plan view illustrating the array substrate of the LCD panel according to a preferred embodiment of the present invention.

FIG. 5 is a partial plan view of an array substrate according to a preferred embodiment of the present invention. Referring to FIG. 5, the gate pad 105 is positioned at the left side of the substrate 101 and the source pad 125 is positioned at the upper side of the substrate 101. A gate shorting bar 103 is arranged in a longitudinal direction at the left peripheral portion of the substrate 101 and a source shorting bar 122 is arranged in a transverse direction at the upper peripheral portion of the substrate 101. A gate line 107 is arranged in a transverse direction on the substrate 101 and a source line 123 is arranged in a longitudinal direction on the substrate 101. The gate and source lines 107 and 123 define the pixel region 156. A thin film transistor (TFT) is positioned at one corner of the pixel region 156 and near the crossing point of the gate and source lines 107 and 123. The TFT includes a gate electrode 109, an active layer 117 and source and drain electrodes 121a and 121b.

FIGS. 6A to 6E are cross-sectional views taken along line VI—VI of FIG. 5 and illustrate a manufacturing process according to the preferred embodiment of the present invention.

Figure 6A:
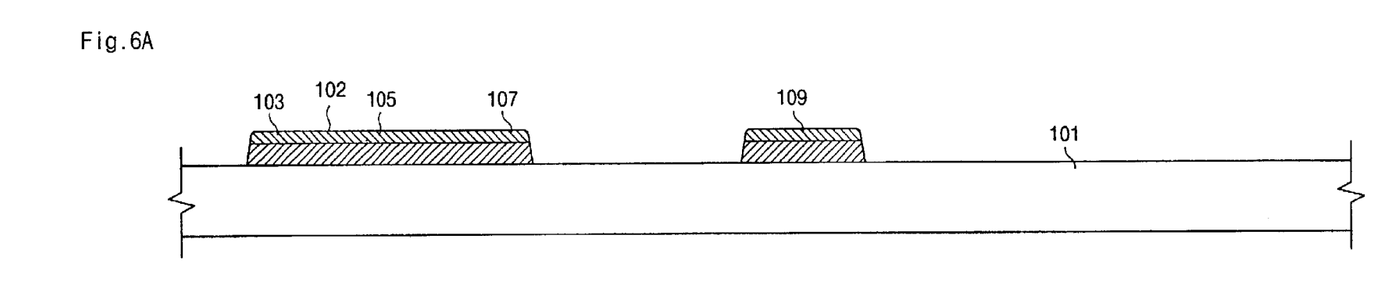
FIGS. 6A to 6E are cross-sectional views taken along line VI—VI of FIG. 5 and illustrate the manufacturing process according to the preferred embodiment of the present invention.

As shown in FIG. 6A, a conductive material including a first metallic material such as aluminum (Al) and Al-alloy is deposited on the substrate 101 and a conductive material including a second metallic material such as molybdenum (Mo), tantalum (Ta), tungsten (W) or antimony (Sb) is sequentially deposited on the first metallic layer. The double-layered metallic layer is patterned to form the gate shorting bar 103, the gate pad 105, a gate shorting bar connector 102 connecting the gate shorting bar 103 to the gate pad 105, a gate line 107 and a gate electrode 109.

The gate electrode 109 extends from the gate line 107 and is positioned at one corner of the pixel region 156 (see FIG. 5). The gate pad 105 is positioned at the end of the gate line 107. The gate shorting bar 103 is connected to every gate pad 105, which is connected to the gate line 107, causing the gate lines to be at an equipotential. Therefore, an open/short-circuit caused by static electricity during the manufacturing process is prevented because the gate pad 105 and the gate line 107 are at an equipotential.

The thickness of the shorting bar connector 102 is preferably thinner than that of the gate line 107. The shorting bar connector 102 may also have a hole or holes (not shown) to facilitate cutting in a later cutting process.

Figure 6B:
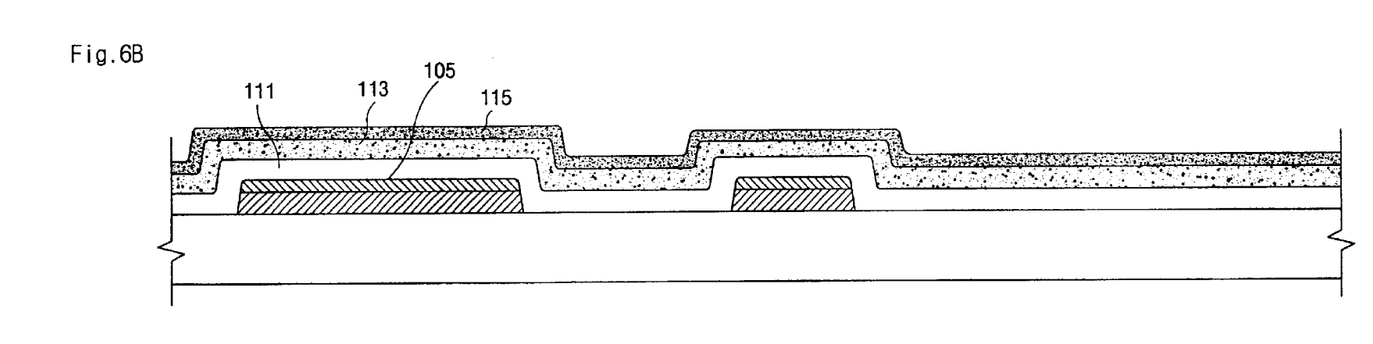

Referring to FIG. 6B, the first insulation layer 111 includes inorganic and organic materials such as silicon nitride ($SiN_x$), silicon oxide ($SiO_x$), Benzocyclobutene (BCB) and acryl. The first insulating layer 111 is formed over the substrate and over the second metallic layer. After forming the first insulation layer 111, an intrinsic semiconductor layer 113 and a doped semiconductor layer 115 are sequentially formed on the first insulation layer 111.

Figure 6C:
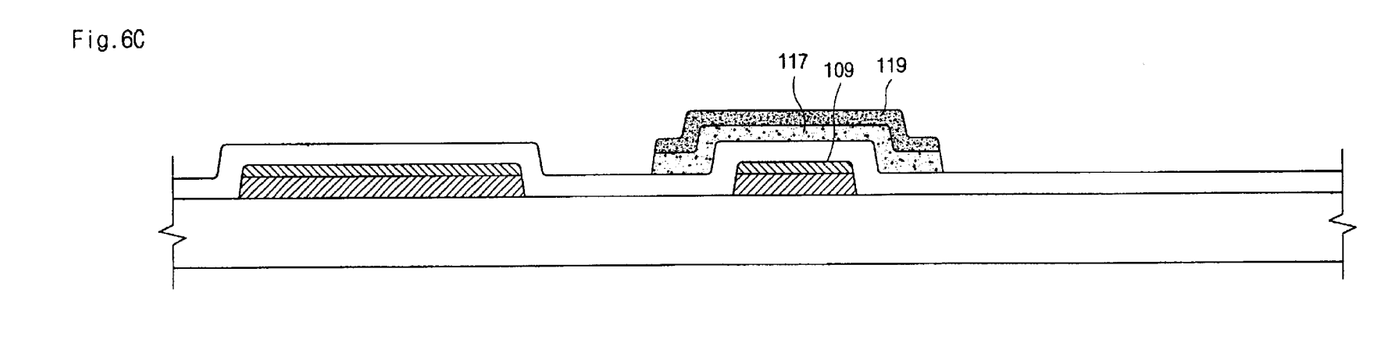

As shown in FIG. 6C, an active layer 117 and an ohmic contact layer 119 are formed into an island shape by patterning the intrinsic and doped semiconductor layers 113 and 115 at the same time.

Figure 6D:
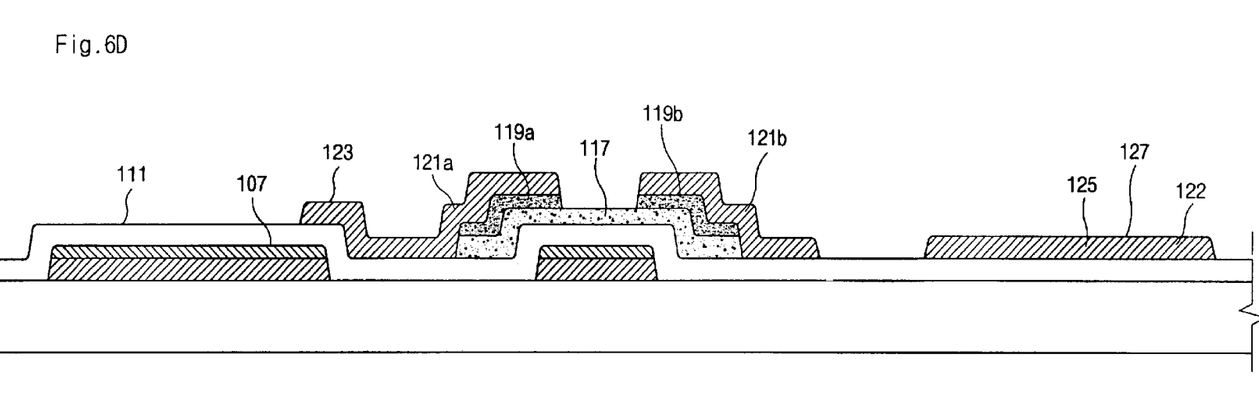

Referring to FIG. 6D, a third metallic material such as chrome or chrome alloy is deposited and patterned to form the source electrode 121a, the drain electrode 121b, the source line 123 connected to the source electrode 121a, the source pad 125 connected to the source line 123, the source shorting bar 122, and the source shorting bar connector 127 connecting the source pad 125 to the source shorting bar 122. The source line 123 is insulated against the gate line 107 by the first insulation layer 111, and the source line 123 is perpendicular to the gate line 107. At this time, the source shorting bar 122 formed at the upper side of the substrate (see FIG. 5) is connected to the even-numbered source pads and the source shorting bar (not shown) formed at the lower side of the substrate is connected to the odd-numbered source pads. Thus, the open-circuit caused by static electricity is effectively prevented since every other source lines are connected to each other.

Figure 6E:
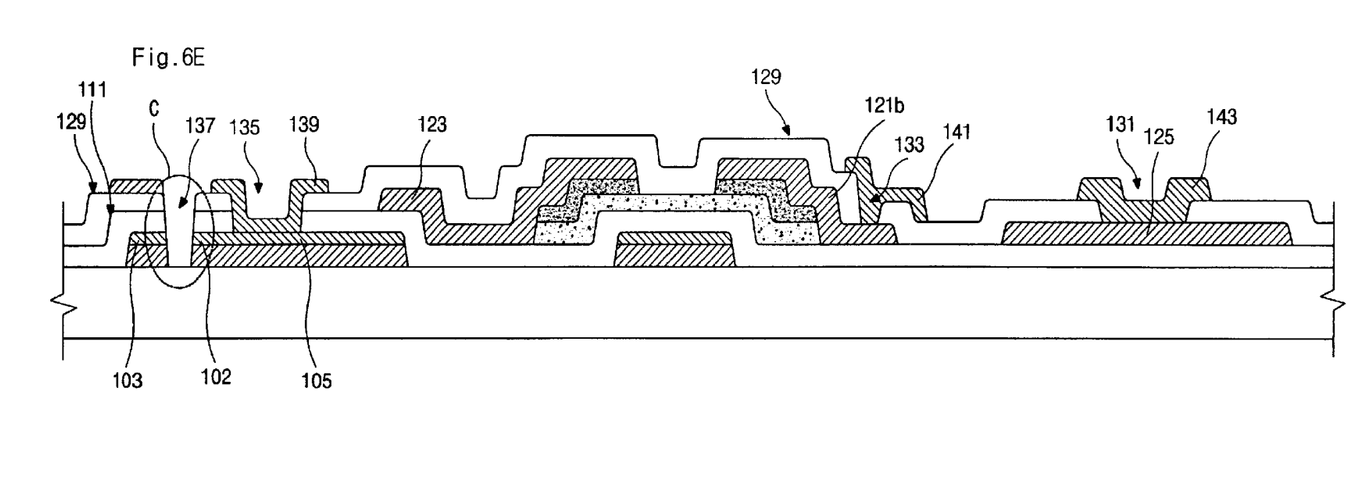

As shown in FIG. 6E, a second insulation layer 129 is formed on the entire surfaces and patterned to form a source pad contact hole 131 and a drain contact hole 133. A gate contact hole 135 is sequentially formed by patterning the first and second insulation layers 111 and 129. Sequentially, the gate cutting holes 137 are formed by patterning the first and second insulation layers 111 and 129 and the gate shorting bar connector 102.

The gate cutting holes 137 are formed to cut the gate shorting bar connector 102. At this time gate lines 107 are classified into even numbered gate lines and odd-numbered gate lines. The gate shorting bar 103 formed at the left side of the substrate (see FIG. 5) is connected to the even-numbered or odd-numbered gate lines and the gate shorting bar (not shown) formed at the right side of the substrate is connected to the odd-numbered or even-numbered gate lines. Thus, in order that the odd-numbered gate lines are independent of the even-numbered gate lines, the gate cutting holes 137 cut every other gate shorting bar connector at both sides. For example, as shown in the drawing, at the left side of the substrate only even-numbered gate shorting bar connectors are cut and at the right side of the substrate only odd-numbered gate shorting bar connectors (not shown) are cut by the gate cutting holes 137.

When forming the gate cutting holes 137, the first and second insulation layers 111 and 127 are patterned wider than the width of the gate shorting bar connector 102. The side portion of the gate cutting hole 137 has an uneven shape (see FIG. 7).

Next, as shown in FIG. 6E, a transparent conductive material such as ITO (Indium-Tin-Oxide) is deposited on the entire surface. The transparent conductive material is patterned to form a gate pad terminal 139 contacting the gate pad 105 via the gate pad contact hole 135, a source pad terminal 143 contacting the source pad 125 via the source pad contact hole 131 and a pixel electrode 141 contacting the drain electrode 121b via the drain contact hole 133. During this patterning process, the transparent conductive material deposited in the gate cutting hole 137 is removed as well.

Figure 7:
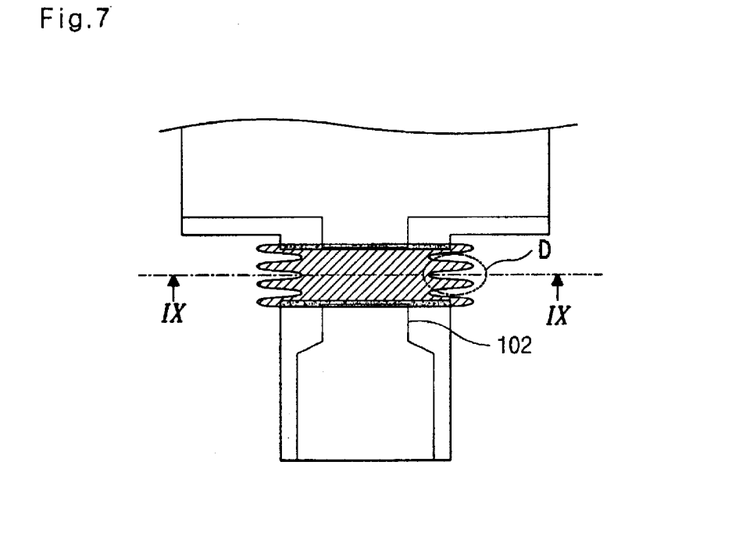
FIG. 7 is an enlarged plan view of the portion "C" of FIG. 6E.

FIG. 7 is an enlarged view illustrating portion "C" of FIG. 6E. The gate cutting hole 137 has an uneven shape by patterning the first and second insulation layers and the gate shorting bar connector. In particular, the side portion of the gate cutting hole 137 has a plurality of concave and convex portions.

Figure 8:
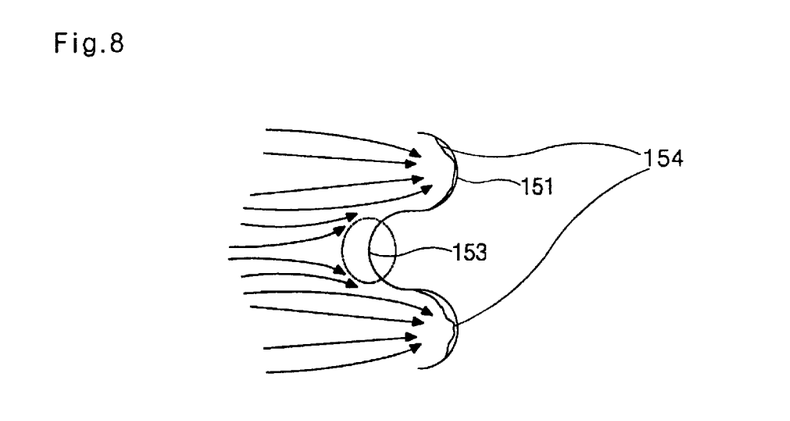
FIG. 8 is an enlarged plan view of the portion "D" of FIG. 7.

FIG. 8 is an enlarged view illustrating portion "D" of FIG. 7. As shown in FIG. 8, when an etchant flows into the gate cutting hole 137 having the uneven shape, the residue 154 of the transparent conductive material, which remains in a convex surface 153, is etched easily because the etchant flows smoothly in the convex surface 153. Thus, although the residue 154 may remain in a concave portion 151, the gate shorting bar connector 102 (see FIG. 7) is electrically disconnected (open circuit) since there is no residue 154 remaining in the convex surface 153.

Figure 9:
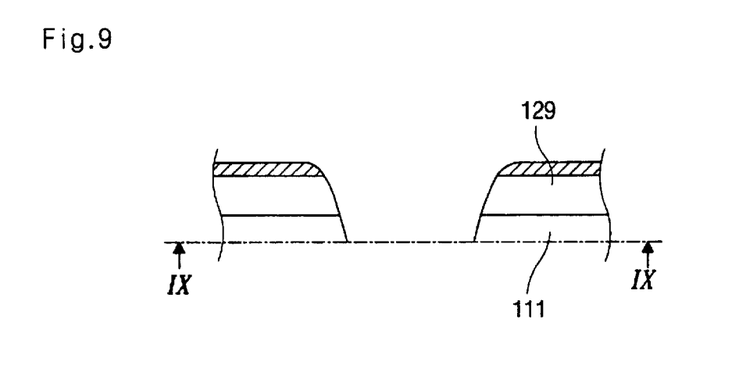
FIG. 9 a cross-sectional view taken line IX—IX of FIG. 7.

FIG. 9 is a cross-sectional view taken along the line IX—IX of FIG. 7. As shown in FIGS. 7 and 9, if the first and second insulation layers 111 and 129 are etched into an uneven shape, the residue 154 of the transparent conductive material is easily exposed to the etchant and is easily etched. Thus, the residue does not remain in the gate cutting hole and the gate shorting bar connector is electrically disconnected. This principle is applied to the source cutting hole to electrically disconnect the source shorting bar connector.

As described above, using a method of manufacturing a TFT array substrate according to the preferred embodiment of the present invention, the gate or date lines are divided into the even-numbered and odd-numbered lines. Moreover, when patterning the first and second insulation layers, the gate and source cutting holes take on an uneven shape having convex and concave surface portions to facilitate the etching of the residue of the transparent conductive material. Accordingly, the residue of the transparent conductive material remaining on the convex surface is easily etched due to its convex shape, effectively disconnecting the gate lines and the source lines from their respective shorting bars.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display (LCD) device, comprising:

a substrate;

a plurality of gate lines, a plurality of first and second gate pads at each end of the gate lines, first and second gate shorting bars, and a plurality of first and second gate shorting bar connectors connecting the first and second gate pads to the first and second gate shorting bars, respectively, on the substrate;

a first insulation layer over the substrate and covering the gate lines, the gate pads, the gate shorting bar connectors and the gate shorting bars;

a plurality of source lines, a plurality of first and second source pads at each end of the source lines, first and second source shorting bars, and a plurality of first and second source shorting bar connectors connecting the first and second source pads to the first and second source shorting bars, respectively, on the first insulating layer;

a second insulation layer over the source lines, the source pads, the source shorting bar connectors and the source shorting bars;

wherein the first insulation layer and the second insulation layer have gate cutting holes penetrating the first and second insulation layers and the gate shorting bar connectors, the gate cutting holes being formed between the first gate shorting bar and the second gate pads and between the second gate shorting bar and the first gate pads;

wherein the second insulation layer has source cutting holes penetrating the second insulation layer and the source shorting bar connectors, the source cutting holes being formed between the first source shorting bar and the second source pads and between the second source shorting bar and the first source pads; and wherein at least one of the gate and source cutting holes has an uneven side portion.

2. The array substrate for a liquid crystal display (LCD) device of claim 1, wherein the uneven side portion of the at least one of the gate and source cutting holes has a concave portion and a convex portion.

3. The array substrate for a liquid crystal display (LCD) device of claim 1, wherein the uneven side portion of the at least one of the gate and source cutting holes has a plurality of concave and convex portions.

4. The array substrate for a liquid crystal display (LCD) device of claim 1, wherein a thickness of the gate shorting bar connector is smaller than that of the gate line.

5. The array substrate for a liquid crystal display (LCD) device of claim 1, wherein a thickness of the source shorting bar connector is smaller than that of the source line.

6. A method of fabricating an array substrate for a liquid crystal display (LCD) device, comprising:

forming a gate line having a gate electrode, a gate pad at an end of the gate line, a gate shorting bar and a gate shorting bar connector connecting the gate shorting bar and the gate pad on a substrate, thereby defining a first intermediate structure;

forming a first insulation layer on the first intermediate structure;

forming an active layer over the gate electrode on the first insulation layer, thereby defining a second intermediate structure;

forming source and drain electrodes connected to the active layer, a source line, a source pad at an end of the source line, a source shorting bar and a source shorting bar connector connecting the source shorting bar and the source pad on the second intermediate structure, thereby defining a third intermediate structure;

forming a second insulation layer on the third intermediate structure;

forming a gate cutting hole by patterning the first and second insulation layers and the gate shorting bar connector; and forming a source cutting hole by patterning the second insulation layer and the source shorting bar connector;

wherein at least one of the gate and source cutting holes has an uneven side portion.

7. The method of fabricating an array substrate for a liquid crystal display (LCD) device of claim 6, wherein the gate shorting bar connector is thinner than that of the gate line.

8. The method of fabricating an array substrate for a liquid crystal display (LCD) device of claim 6, wherein the source shorting bar connector is thinner than that of the source line.

9. The method of fabricating an array substrate for a liquid crystal display (LCD) device of claim 6, further comprising:

forming a gate pad hole penetrating the first and second insulation layers to expose the gate pad;

forming a source pad hole penetrating the second insulation layer to expose the source pad; and forming first and second lines connected to the gate pad and the source pad via the gate pad hole and source pad hole, respectively.

10. The method of fabricating an array substrate for a liquid crystal display (LCD) device of claim 9, wherein the first and second lines are made of a transparent conductive material.

11. The method of fabricating an array substrate for a liquid crystal display (LCD) device of claim 10, wherein the transparent conductive material includes indium-tin-oxide (ITO).

* * * * *